United States Patent [19]

Asano et al.

[11] Patent Number: 6,013,700
[45] Date of Patent: Jan. 11, 2000

[54] PROCESS FOR PRODUCING GRANULAR POWDER OF MODIFIED POLYTETRAFLUOROETHYLENE

[75] Inventors: Michio Asano; Shingo Tanigawa; Shoji Kawachi; Tetsuo Shimizu, all of Settsu, Japan

[73] Assignee: Daikin Industries, Ltd., Osaka, Japan

[21] Appl. No.: 09/011,632

[22] PCT Filed: Aug. 8, 1996

[86] PCT No.: PCT/JP96/02256

§ 371 Date: Feb. 10, 1998

§ 102(e) Date: Feb. 10, 1998

[87] PCT Pub. No.: WO97/07157

PCT Pub. Date: Feb. 27, 1997

[30] Foreign Application Priority Data

Aug. 11, 1995 [JP] Japan .................................. 7-205546

[51] Int. Cl.$^7$ .................. C08J 3/16; C08J 3/12; C08F 14/26
[52] U.S. Cl. .................. 523/335; 528/497; 528/499; 526/250; 264/117; 264/122
[58] Field of Search ..................... 528/497, 499; 523/335; 526/250; 264/117, 122

[56] References Cited

U.S. PATENT DOCUMENTS

| | | | |
|---|---|---|---|
| 3,366,615 | 1/1968 | Miller et al. ........................... | 264/117 |
| 3,527,857 | 9/1970 | Fitz ....................................... | 528/498 |
| 3,766,133 | 10/1973 | Roberts et al. ....................... | 264/117 |
| 3,781,258 | 12/1973 | Kometani et al. ..................... | 528/497 |
| 4,439,385 | 3/1984 | Kuhls et al. .......................... | 528/497 |
| 5,576,381 | 11/1996 | Bladel et al. ......................... | 526/250 |

FOREIGN PATENT DOCUMENTS

| | | |
|---|---|---|
| 54-54156 | 4/1979 | Japan . |
| 58-65722 | 4/1983 | Japan . |
| 63-159438 | 7/1988 | Japan . |
| 2-239911 | 9/1990 | Japan . |
| 4-13729 | 1/1992 | Japan . |
| 5-186605 | 7/1993 | Japan . |
| WO 93/16126 | 8/1993 | WIPO . |

*Primary Examiner*—Tae Yoon
*Attorney, Agent, or Firm*—Kubovcik & Kubovcik

[57] ABSTRACT

To provide a process capable of preparing a modified PTFE granular powder, in which the ganular powder having excellent handling property, i.e. powder flowability and apparent density is prepared without using a finely pulverized powder and a molded article obtained from the granular powder has excellent physical properties, and a process capable of preparing a modified PTFE granular powder, in which the ganular powder is granulated with only water without using an organic liquid and further a molded article having a break down voltage equal to that in the case of using a finely pulverized powder of unmodified PTFE can be obtained. The granulation is carried out by stirring, in an aqueous medium, a powder of perfluoro(vinyl ether)-modified polytetrafluoroethylene prepared by suspension polymerization and having an average particle size of 100 to 300 μm.

8 Claims, 6 Drawing Sheets

PARTICLE SIZE OF PRIMARY PARTICLE
(μm: Dry Laser Method)

1  Graph of Hot-Water-Granulated Powder (Modified PTFE)

2  Graph of Base Powder (Modified PTFE)

3  Graph of Powder Prepared by Aqueous Granulation Method (Modified PTFE)

1 Graph of Hot-Water-Granulated Powder (Modified PTFE)

2 Graph of Base Powder (Modified PTFE)

3 Graph of Powder Prepared by Aqueous Granulation Method (Modified PTFE)

1  Graph of Hot-Water-Granulated Powder (Modified PTFE)

2  Graph of Base Powder (Modified PTFE)

3  Graph of Powder Prepared by Aqueous Granulation Method (Modified PTFE)

PARTICLE SIZE OF PRIMARY PARTICLE
(μm: Dry Laser Method)

1 Graph of Hot-Water-Granulated Powder (Modified PTFE)

2 Graph of Base Powder (Modified PTFE)

3 Graph of Powder Prepared by Aqueous Granulation Method (Modified PTFE)

4 Graph of Hot-Water-Granulated Powder (Unmodified PTFE)

1  Graph of Hot-Water-Granulated Powder (Modified PTFE)

2  Graph of Base Powder (Modified PTFE)

3  Graph of Powder Prepared by Aqueous Granulation Method (Modified PTFE)

4  Graph of Hot-Water-Granulated Powder (Unmodified PTFE)

PARTICLE SIZE OF PRIMARY PARTICLE
(μm: Dry Laser Method)

1   Graph of Hot-Water-Granulated Powder (Modified PTFE)

2   Graph of Base Powder (Modified PTFE)

3   Graph of Powder Prepared by Aqueous Granulation Method (Modified PTFE)

4   Graph of Hot-Water-Granulated Powder (Unmodified PTFE)

PROCESS FOR PRODUCING GRANULAR POWDER OF MODIFIED POLYTETRAFLUOROETHYLENE

TECHNICAL FIELD

The present invention relates to a process for preparing a granular powder of modified polytetrafluoroethylene.

The present invention particularly relates to a process for preparing a granular powder of modified polytetrafluoroethylene by granulating a powder of perfluoro(vinyl ether)-modified polytetrafluoroethylene as a molding powder which is obtained by suspension polymerization substantially in the absence of an emulsifying agent.

BACKGROUND ART

Hitherto many proposals with respect to a process for preparing a granular powder by granulating a polytetrafluoroethylene (PTFE) powder have been made. For example, JP-B-44-22619 discloses a process for stirring and granulating a PTFE powder in an aqueous medium of 30° to 150° C. containing a water-insoluble organic liquid having a boiling point of 30° to 150° C.

In order to improve the process disclosed in the above-mentioned patent publication, JP-B-5 7-15128 discloses a process in which an equipment having mechanism for pulverizing a PTFE powder is employed.

As a process for granulating by using water only, for example, JP-B-43-8611 discloses a process for granulating in which a PTFE powder is stirred in water of 40° to 90° C., JP-B-47-3187 discloses a process for granulating in which a PTFE powder is stirred in an aqueous medium of not less than 40° C., and further JP-A-3-259926 discloses a process for granulating in which a PTFE powder is stirred in an aqueous medium in combination use of pulverizing mechanism.

Any of the processes disclosed in the above-mentioned patent publications use a so-called finely pulverized PTFE powder having an average particle size of less than 100 $\mu$m. The reason why the finely pulverized powder is used is that when a coarsely pulverized powder is used, a molded article obtained therefrom is poor in physical properties, for example, tensile strength.

It is possible to pulverize a PTFE powder to an average particle size of about 100 $\mu$m with a coarsely pulverizing machine, but when pulverizing to an average particle size of less than 100 $\mu$m, another finely pulverizing step is separately necessary.

However, the finely pulverizing machine is expensive, and demands a larger energy consumption because machine size is large. Further there are required a pneumatic equipment for feeding the PTFE powder to the finely pulverizing machine, an auxiliary equipment for pneumatic line, a bag filter for collecting the obtained finely pulverized powder and the like.

For the mentioned reasons, it is strongly required that the granulation is conducted by using a coarsely pulverized powder having an average particle size of not less than 100 $\mu$m as a PTFE powder to produce a PTFE granular powder giving a molded article having good physical properties.

As a granulation process with a coarsely pulverized powder, there is no process but a process disclosed in, for example, JP-A-3-259925, which is a process for granulating in which a PTFE powder of 420 $\mu$m particle size is stirred in an aqueous medium of 60° to 100° C. in combination use of pulverizing mechanism.

Even by the process disclosed in the above-mentioned patent publication, the obtained PTFE granular powder does not sufficiently satisfy physical properties of a molded article such as tensile strength, and for commercial production, a further step such as a gelling and pulverizing step is required. Also since a molded article obtained by molding the granular powder has a low break down voltage, it cannot be used for applications requiring a high break down voltage. Further as mentioned above, that process requires the pulverizing mechanism.

The present inventors have studied, from various aspects, conventional processes for preparation of a PTFE granular powder by using a finely pulverized powder of tetrafluoroethylene homopolymer, and as a result, have found that use of modified PTFE, particularly perfluoro(vinyl ether)-modified PTFE enables a granulation process of a coarsely pulverized powder to give an excellent flowability, that is, handling property and a good apparent density, to a granular powder and enables a granulation process in which only water is used. The thus obtained modified PTFE granular powder gives a molded article having an excellent break down voltage.

An object of the present invention is to provide a process for preparing, without using a finely pulverized powder, a modified PTFE granular powder being excellent in handling property, i.e. flowability and in apparent density and giving a molded article having excellent physical properties.

Another object of the present invention is to provide a process in which granulation is carried out without using an organic liquid, but with water only.

Further object of the present invention is to provide a process for preparing a modified PTFE granular powder which gives a molded article having break down voltage equal to that of a molded article obtained from finely pulverized powder of unmodified PTFE, even if the modified PTFE granular powder is obtained from a coarsely pulverized powder.

DISCLOSURE OF THE INVENTION

The present invention relates to a modified polytetrafluoroethylene granular powder prepared through granulation by stirring, in an aqueous medium, a powder of perfluoro(vinyl ether)-modified polytetrafluoroethylene obtained by suspension polymerization and having an average particle size of 100 to 300 $\mu$m.

Also in the present invention, it is preferable to carry out the above-mentioned granulation under a pressure of 0 to 5 kg/cm$^2$G in an aqueous medium of 50° to 160° C. in the absence of an organic liquid.

Also in the present invention, it is preferable to carry out the above-mentioned granulation under a pressure of 0 to 5 kg/cm$^2$G in an aqueous medium of 10° to 120° C. in the presence of an organic liquid.

Also in the present invention, it is preferable that an average particle size of the powder of perfluoro(vinyl ether)-modified polytetrafluoroethylene obtained by suspension polymerization is from 100 to 150 $\mu$m and that a break down voltage of a molded article obtained by molding the granular powder prepared by granulation with stirring is not less than 3.5 kV.

Also in the present invention, it is preferable that the above-mentioned modified polytetrafluoroethylene is a copolymer prepared by copolymerizing 99.0 to 99.999% by mole of tetrafluoroethylene (TFE) with 1.0 to 0.001% by mole of perfluoro(alkyl vinyl ether) or perfluoro(alkoxyalkyl vinyl ether) represented by the formula (I):

$$CF_2=CF-OR_f \quad (I)$$

wherein $R_f$ is a perfluoroalkyl group having 1 to 10 carbon atoms, a perfluoro(alkoxyalkyl) group having 4 to 9 carbon atoms, an organic residue represented by the formula (II):

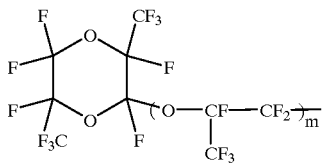

(II)

wherein m is 0 or an integer of 1 to 4, or an organic residue represented by the formula (III);

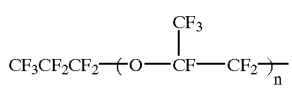

(III)

wherein n is an integer of 1 to 4.

Also in the present invention, it is preferable to carry out the above-mentioned granulation in the presence of polytetrafluoroethylene aqueous dispersion obtained by emulsion polymerization in an amount of 0.1 to 10% by weight based on perfluoro(vinyl ether)-modified polytetrafluoroethylene powder.

Also in the present invention, it is preferable that polytetrafluoroethylene in the polytetrafluoroethylene aqueous dispersion is a tetrafluoroethylene homopolymer or a modified polytetrafluoroethylene obtained by copolymerizing 98.0 to 99.999% by weight of tetrafluoroethylene with 2.0 to 0.001% by weight of other fluorine-containing monomer.

BEST MODE FOR CARRYING OUT THE INVENTION

Figure 1:
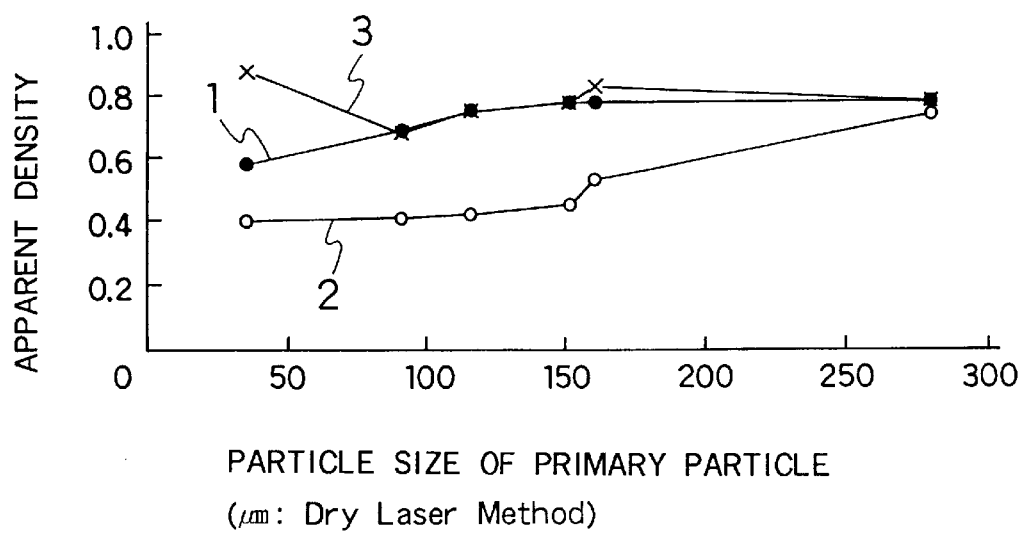
FIG. 1 is a graph for explaining relation of the apparent density and the particle size of primary particles in Experimental Examples 1 to 6.

In the present invention, the above-mentioned perfluoro (vinyl ether)-modified PTFE may be a copolymer obtained by copolymerizing, for example, 99.0 to 99.999% by mole, preferably 99.9 to 99.99% by mole of TFE with 1.0 to 0.001% by mole, preferably 0.1 to 0.01% by mole of a compound represented by the formula (I):

$$CF_2=CF-OR_f \quad (I),$$

and as a copolymerization method, usual suspension polymerization may be used.

When the percentage of TFE is in the above-mentioned range, there is obtained effect of exhibiting excellent tensile strength, elongation and crack resistance. Also when the percentage of the compound represented by the formula (I) is in the above-mentioned range, there is obtained effect of exhibiting excellent creep resistance.

In the formula (I), $R_f$ represents a perfluoroalkyl group having 1 to 10 carbon atoms, a perfluoro(alkoxyalkyl) group having 4 to 9 carbon atoms, an organic residue represented by the formula (II) or an organic residue represented by the formula (III).

The number of carbon atoms of the perfluoroalkyl group is from 1 to 10, preferably from 1 to 5. When the number of carbon atoms is in the above range, effect of exhibiting excellent creep resistance can be obtained with maintaining not-melt-processable characteristic.

Examples of the perfluoroalkyl group are, for instance, perfluoromethyl, perfluoroethyl, perfluoropropyl, perfluorobutyl, perfluoropentyl, perfluorohexyl and the like. From the viewpoints of creep resistance and cost of monomer, perfluoropropyl is preferable.

In the present invention, there are used primary particles having an average particle size of 100 to 300 μm and obtained by coarsely pulverizing a powder of the perfluoro (vinyl ether)-modified PTFE in the presence of water or in dry state, for example, with a pulverizing machine such as a hammer mill, a grinder having a rotor with blades, a jet mill or an impact mill.

When the average particle size of the primary particles is in the above range, there can be obtained excellent handling property, i.e. flowability and excellent apparent density of the powder and excellent physical properties of the obtained molded article. Particularly when the average particle size of the primary particles is in the range of 100 to 150 μm, there can be obtained an effect of giving excellent break down voltage to the obtained molded article.

As the aqueous medium used in the present invention, water is usually used. Water is not necessarily one having high purity. However if inorganic or organic impurities are mixed in water, they remain in the obtained modified PTFE granular powder, which causes undesirable coloring on the molded article and lowering of break down voltage. Therefore, it is necessary to eliminate such impurities previously from the aqueous medium.

The aqueous medium is used in an amount of 150 to 5000% (% by weight, hereinafter the same) on the basis of the powder of perfluoro(vinyl ether)-modified PTFE. After addition of the powder into the aqueous medium, stirring for granulation is carried out. An amount of the aqueous medium is much enough to give flowability to the aqueous medium containing the powder of perfluoro(vinyl ether)-modified PTFE. Excess amount is disadvantageous from economical point of view. On the contrary, an insufficient amount cannot make the granulating operations smooth. However, as far as the aqueous medium containing the perfluoro(vinyl ether)-modified PTFE is in the completely flowable state, there is no problem even if the amount of the aqueous medium increases or decreases somewhat.

In the present invention, in order to granulate the powder of perfluoro(vinyl ether)-modified PTFE by stirring it in the aqueous medium, there are, for example, a method of granulating in which the powder is stirred in the aqueous medium of 10° to 120° C. in the presence of an organic liquid (hereinafter may be referred to as "aqueous granulation method"), a hot water granulation method in which granulation is carried out by stirring in the aqueous medium of 50° to 160° C. in the absence of an organic liquid, and other methods. From a point that it is not necessary to use expensive organic liquid, the hot water granulation method is preferable.

As the organic liquid used in the present invention, there may be used, for example, a water-insoluble organic liquid having a surface tension at 25° C. of not more than about 40 dyne/cm. As the examples thereof, there can be used aliphatic hydrocarbons such as pentane and dodecane; aromatic hydrocarbons such as benzene, toluene and xylene; halogenated hydrocarbons such as tetrachloroethylene, trichloroethylene, chloroform, chlorobenzene, trichlorotrifluoroethane, monofluorotrichloromethane and difluorotetrachloroethane; and the like. Among them, halogenated hydrocarbons are preferable. Particularly preferable are chlorinated hydrocarbons and fluorochlorinated hydrocarbons such as 1,1,1-trichloroethane, 1,1-dichloro-2,2,3,3,3-pentafluoropropane, 1,3-dichloro-1,1,2,2,3-pentafluoropropane, 1,1-dichloro-2,2,2-trifluoroethane and 1,1-dichloro-1-fluoroethane. This is because those organic liquids are inflammable and satisfy requirements for flon restriction. Those organic liquids may be used solely or in combination of two or more thereof.

It is preferable that the amount of the organic liquid is from 5 to 100%, more preferably from 10 to 20% on the basis of the aqueous medium from the viewpoints of an average particle size and apparent density of the granular powder granulated.

In the present invention, in the case of the hot water granulation method where the granulation is carried out by stirring the powder of perfluoro(vinyl ether)-modified PTFE in the aqueous medium in the absence of the organic liquid, the stirring may be carried out at a temperature within the range of 50° to 160° C., preferably 50° to 120° C., more preferably 90° to 120° C.

In that case, the temperature condition is very important. By maintaining a temperature of the slurry in the above-mentioned range, there can be easily obtained the modified PTFE granular powder having a desired particle size, a large apparent density, excellent powder flowability, uniform particle size, dense property and excellent electrical property.

As an equipment which can be used in the process of the present invention, there may be used one equipped with a conventional stirring mechanism, and, for example, an equipment as disclosed in JP-A-3-259926 can be used. In the present invention, an equipment with a pulverizing mechanism is not necessarily required.

In the process of the present invention, in addition to the PTFE powder, there can be used a PTFE aqueous dispersion obtained by emulsion polymerization and having an average particle size of 0.05 to 0.5 μm and a solid content of 10 to 60%. The use of the PTFE aqueous dispersion makes it possible to prevent production of a finely divided powder of the perfluoro(vinyl ether)-modified polytetrafluoroethylene at the time of the granulation.

When using the PTFE aqueous dispersion, PTFE in the dispersion covers the finely divided powder and then the finely divided powder disappear. Therefore, hysical properties of the granular powder are not lowered and handling property, i.e. flowability of the granular powder is enhanced.

An amount of the PTFE aqueous dispersion is from 0.1 to 10% by weight, more preferably from 1 to 3% by weight on the basis of the perfluoro(vinyl ether)-modified polytetrafluoroethylene powder. It is suitable to add the PTFE aqueous dispersion before the perfluoro(vinyl ether)-modified polytetrafluoroethylene powder is added to water.

PTFE in the PTFE aqueous dispersion includes not only tetrafluoroethylene homopolymer but also a copolymer such as modified PTFE obtained by copolymerizing 98.0 to 99.999% by weight of tetrafluoroethylene with 2.0 to 0.001% by weight of other fluorine-containing monomer such as chlorotrifluoroethylene, hexafluoropropene or perfluoro(alkyl vinyl ether).

As the aqueous granulation method of the present invention, there can be employed, for example, method mentioned below.

A 10-liter stainless steel granulation tank equipped with a stirrer is charged with 3 to 7 liters of deionized water as the aqueous medium and further 400 to 1,500 ml of the above-mentioned organic liquid. To the mixture is added 1 to 2 kg of a powder of perfluoro(vinyl ether)-modified PTFE (water content: 10 to 20%) which was coarsely wet-pulverized previously to 100 to 300 μm. Then with stirring at 400 to 800 rpm, a temperature in the system is kept in the range of 10° to 120° C. The stirring is continued at around the mentioned temperature for 0.5 to 2 hours to complete the granulation.

Then the stirring is stopped, and the wet modified PTFE granular powder obtained by filtration employing a 150 mesh sieve is dried at 120° to 180° C. for 20 to 10 hours in an electric oven to give 1 to 2 kg of a modified PTFE granular powder of the present invention.

Physical properties of the obtained modified PTFE granular powder and molded article are, for example, as follows.

Average particle size: 200 to 1,000 μm

Apparent density: 0.6 to 0.95

Flowability: 4 to 8 times (21B method)

Break down voltage: 1.5 to 7 (kV/0.1 mm)

Tensile strength: 200 to 450 (kg/cm$^2$G)

Elongation: 200 to 400 (%)

The modified PTFE granular powder obtained according to the above-mentioned process can be prepared without using a finely pulverized powder and has excellent handling property, i.e. flowability and apparent density. The obtained molded article is excellent in physical properties. The modified PTFE granular powder can be suitably used as a molding material for, for example, packing, gasket, lining sheet of storage tank for chemical liquids, and the like.

Also in the present invention, the aqueous granulation can be carried out under pressure. From the viewpoint of equipment cost required for a pressure resistant structure of the granulation tank, the granulation pressure is from 0 to 5 kg/cm$^2$G, preferably from 0 to 2 kg/cm$^2$G, more preferably 0 kg/cm$^2$G.

In the hot water granulation method of the present invention, there can be employed the same procedures as in the aqueous granulation method except that the organic liquid is not used and the temperature in the system is adjusted to 50° to 160° C.

Physical properties of the modified PTFE granular powder obtained through the hot water granulation method and molded article are, for example, as follows.

Average particle size: 200 to 1,000 μm

Apparent density: 0.6 to 0.9

Flowability: 4 to 8 times (21B method)

Break down voltage: 1.5 to 7 (kV/0.1 mm)

Tensile strength: 200 to 450 (kg/cm$^2$G)

Elongation: 200 to 400 (%)

The modified PTFE granular powder obtained according to the hot water granulation method can be prepared by granulation with water only without using an organic liquid and without a finely pulverized powder, and has excellent handling property, i.e. flowability. The molded article obtained is therefore excellent in physical properties. The modified PTFE granular powder can be suitably used as the same molding material as mentioned above.

Also in the present invention, the hot water granulation can be carried out under pressure. From the viewpoint of equipment cost required for a pressure resistant structure of the granulation tank, the granulation pressure is from 0 to 5 kg/cm$^2$G, preferably from 0 to 2 kg/cm$^2$G, more preferably 0 kg/cm$^2$G.

Also in the present invention, by adjusting an average particle size of the perfluoro(vinyl ether)-modified PTFE powder to 100 to 150 $\mu$m, break down voltage of the obtained molded article becomes not less than 3.5 kV.

EXAMPLE

The present invention is then explained by means of Experimental Examples, and is not limited thereto.

Test methods in Experimental Examples (physical properties of powders and molded articles) are mentioned below.

Apparent density: Measured according to JIS K 6891—5.3. Particle size after coarsely pulverizing (Particle size of primary particles)

Dry laser method: Measured under a pressure of 3 bar by using a laser diffraction type particle size distribution meter Herosystem available from Nippon Denshi Kabushiki Kaisha.

Flowability: Measured according to the method disclosed in JP-A-3-259925.

Figure 3:
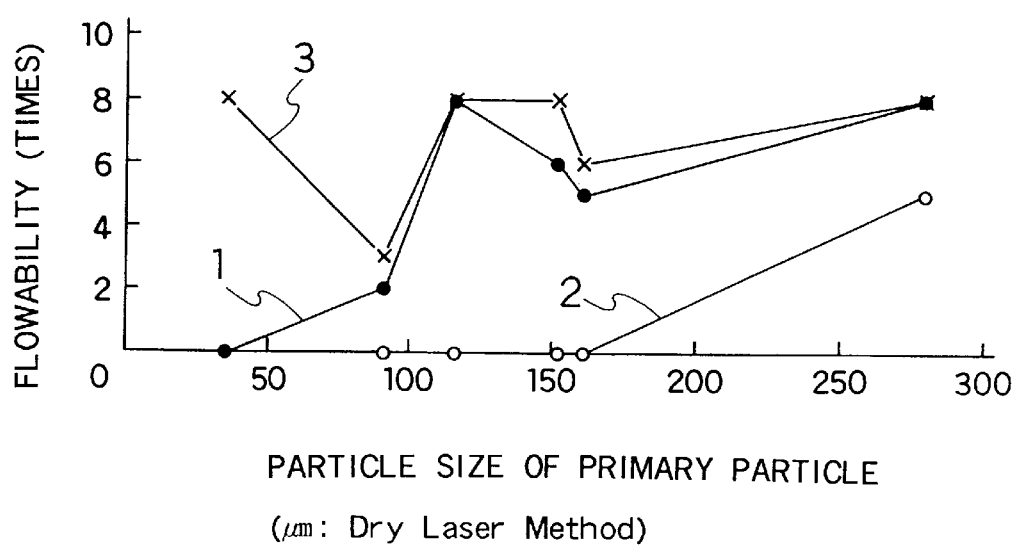
FIG. 3 is a graph for explaining relation of the flowability and the particle size of primary particles in Experimental Examples 1 to 6.

Namely as an equipment for measuring the flowability, there is used one shown in FIG. 3 of the mentioned patent publication and comprising a support base (42) and upper and lower hoppers (31) and (32), the both of which are aligned on their center lines and supported on the support base (42). The upper hopper (31) has an inlet (33) of a 74 mm diameter and an outlet (34) of a 12 mm diameter. The height from the inlet (33) to the outlet (34) is 123 mm. The outlet (34) is provided with a partition plate (35), and thereby the powder in the hopper can be kept therein or dropped optionally. The lower hopper (32) has an inlet (36) of a 76 mm diameter and an outlet (37) of a 12 mm diameter. The height from the inlet (36) to the outlet (37) is 120 mm. The outlet (37) is provided with a partition plate (38) like the upper hopper. The distance between the partition plates of the upper and lower hoppers is adjusted to 15 cm. In FIG. 3, numerals (39) and (40) indicate outlet covers of the upper and lower hoppers, respectively. Numeral (41) is a vessel for receiving the dropped powder.

Prior to measuring the flowability, about 200 g of powder is allowed to stand for not less than four hours in a room, the temperature of which is adjusted to 23.5° to 24.5° C., and then sieved with a 10 mesh sieve (sieve opening: 1,680 $\mu$m). The measurement of the flowability is carried out at the same temperature.

(I) At first, immediately after the upper hopper (31) is charged with just a cup of powder by using a 30 cc cup, the partition plate (35) is pulled out to drop the powder into the lower hopper. When the powder does not drop, the powder is stuck with a wire. After the powder has dropped completely into the lower hopper (32), the dropped powder is allowed to stand for 15±2 seconds, and then the partition plate (38) of the lower hopper is pulled out to see whether the powder is dropped or not from the outlet (37). When the powder is dropped completely within eight seconds, the powder is estimated to have been dropped as required.

(II) The same steps as above are repeated three times to see if the powder is dropped as required. In case where the powder is dropped satisfactorily twice or more, the flowability of the powder is estimated to be "Good." In case where the powder is never dropped, the flowability of the powder is estimated to be "Not good." In case where in three series of the dropping test, the powder has been dropped only one time, the dropping test is further conducted twice, and when the two series of the dropping test are both satisfactory, the flowability is estimated to be "Good." In other cases, the flowability is estimated to be "Not good."

(III) With respect to the powder estimated to be "Good," the upper hopper is charged with two cups of powder by using the same 30 cc cup, and the dropping test of the powder is conducted in the same manner as above. When as a result, the flowability is estimated to be "Good," the number of cups filled with the powder is increased successively and the dropping test is continued until the flowability is estimated to be "Not good." The dropping test is conducted up to eight cups at most. The powder having flowed out from the lower hopper in the previous dropping test may be re-used.

(IV) The larger the amount of the PTFE powder is, the more difficult to drop.

The number of cups when the flowability is estimated to be "Not good" is substracted by 1, and the obtained value is taken as "Flowability" of the powder. Average particle size of granular powder:

Standard sieves of 10, 20, 32, 48 and 60 meshes (inch mesh) are placed in that order from the top, and PTFE granular powder is put on the 10 mesh sieve. The sieves are vibrated to drop smaller particles downward through each sieve in order. Then after the ratio of the powder remaining on each sieve is obtained by %, accumulated percentages (ordinate) of each remaining powder to the openings of each sieve (abscissa) are plotted on the logarithmic probability paper, and those points are connected with a line. The particle size, the proportion of which is 50% on that line, is obtained and is regarded as an average particle size. Particle size distribution:

The particle size distribution is a proportion in weight of the particles having a diameter 0.7 to 1.3 times the average particle size on the basis of the whole particles, and is calculated by multiplying the average particle size by 0.7 or 1.3. The obtained values are plotted on the accumulated weight percentage curve, and thus the weight percentage is obtained. Tensile strength (hereinafter may be referred to as "TS") and elongation (hereinafter may be referred to as "EL"):

A die having an inner diameter of 50 mm is charged with a powder of 210 g and a pressure is gradually applied thereto over about 30 seconds until the final pressure reaches about 300 kg/cm$^2$. Further that pressure is kept for 5 minutes to give a pre-molded article. The pre-molded article is taken out of the die mold and heated up to 365° C. in an electric oven (atmosphere: air) at a rate of 50° C./hour. After that temperature is kept for 5.5 hours, the pre-molded article is cooled to a room temperature at a rate of 50° C./hour to obtain a sintered article having a cylindrical form. The sintered article is cut along its side to give a 0.5 mm thick band-like sheet which is then punched with a JIS dumbbel No. 3 to give a sample. The sample is stretched at a stretching rate of 200 mm/minute with an autograph having a gross weight of 500 kg according to JIS K 6891-58, and then a stress at break of the sample and elongation are measured.

Break down voltage (hereinafter may be referred to as "B. D. V."):

A block of a molded article which is produced in the same manner as for measurement of the tensile strength and elongation is cut to give a 0.1 mm thick tape. The break down voltage is measured by using the obtained tape according to JIS K 6891.

Surface roughness: Measured according to JIS B 0601.

Experimental Example 1

(1) Base Powder

A perfluoro(vinyl ether)-modified PTFE powder (Polyflon M-111 which is a modified PTFE available from Daikin Industries, Ltd. and copolymerized with 0.1% by mole of perfluoro(propyl vinyl ether)) in the form of reactor powder was used as a base powder. Physical properties of the base powder and molded article were measured according to the above-mentioned test methods. The results are shown in Table 1.

(2) Powder Prepared by Hot Water Granulation Method A 10-liter granulation tank equipped with a stirrer was charged with 6.7 liter of deionized water and 1.5 kg of the mentioned base powder. With stirring at 800 rpm, the inside of the system was heated up to around 90° C. over 20 minutes. In that state, the granulation was carried out over three hours.

Then the heating and stirring were stopped and a wet powder was obtained through filtration by using a 150 mesh sieve. The wet powder was then dried at 165° C. in an electric oven for 16 hours to give 1.495 kg of a modified PTFE granular powder. With respect to the modified PTFE granular powder, physical properties of the powder and molded article were measured according to the above-mentioned test methods. The results are shown in Table 1.

(3) Powder Prepared by Aqueous Granulation Method

A modified PTFE granular powder was prepared in the same manner as in the above-mentioned steps for preparing the hot-water-granulated powder except that 750 ml of $CH_2Cl_2$ was added as an organic liquid after charging of the base powder, the inside temperature of the system was adjusted to 38° C. and the granulation was carried out for 10 minutes. With respect to the obtained modified PTFE granular powder, physical properties of the powder and molded article were measured by the mentioned test methods. The results are shown in Table 1.

Experimental Examples 2 to 6

(1) Base Powder

A base powder was obtained by using a pulverizing machine "JIYU MILL" available from Nara Kikai Kabushiki Kaisha and having a motor power of 2.2 kW and a screen diameter shown in Table 1 and by rotating a hammer at the number of rotations shown in Table 1 to coarsely pulverize M-111. With respect to the obtained base powder, physical properties of the powder and molded article were measured by the mentioned test methods. The results are shown in Table 1.

(2) Powder Prepared by Hot Water Granulation Method

A modified PTFE granular powder was prepared through the same preparation steps as in (2) of Experimental Example 1 except that the base powder obtained in each of Experimental Examples 2 to 6 was used. With respect to the obtained modified PTFE granular powder, physical properties of the powder and molded article were measured by the mentioned test methods. The results are shown in Table 1.

(3) Powder Prepared by Aqueous Granulation Method

A modified PTFE granular powder was prepared through the same preparation steps as in (3) of Experimental Example 1 except that the base powder obtained in each of Experimental Examples 2 to 6 was used. With respect to the obtained PTFE granular powder, physical properties of the powder and molded article were measured by the mentioned test methods. The results are shown in Table 1.

TABLE 1

| | Experimental Example | | | | | |
|---|---|---|---|---|---|---|
| | 1 | 2 | 3 | 4 | 5 | 6 |
| Base powder | | | | | | |
| Kind | M-111 | M-111 | M-111 | M-111 | M-111 | M-111 |
| Screen diameter (mm) | — | 0.5 | 0.5 | 0.5 | 0.3 | — |
| Number of rotations (rpm) | Reactor powder | 3000 | 5000 | 9600 | 9600 | 4P |
| Apparent density | 0.74 | 0.53 | 0.45 | 0.42 | 0.40 | 0.35 |
| Particle size after coarsely pulverizing ($\mu$m) Dry laser method | 280 | 161 | 152 | 116 | 91 | 30 |
| TS (kg/cm$^2$G) | 218 | 309 | 321 | 334 | 428 | 439 |
| EL (%) | 272 | 347 | 361 | 370 | 398 | 453 |
| B.D.V. (mean; kV) | 1.5 | 4.7 | 7.6 | 11.5 | 11.6 | 12.8 |
| Surface roughness ($\mu$m) | 4.5 | 2.6 | 2.0 | 1.8 | 1.5 | 1.1 |
| Powder prepared by hot water granulation method | | | | | | |
| Apparent density | 0.78 | 0.78 | 0.78 | 0.75 | 0.69 | 0.58 |
| Flowability (21B method; times) | 8 | 5 | 6 | 8 | 2 | 0 |
| Flowability (23 method; times) | 2 | 0 | 1 | 5 | 1 | 0 |
| Average particle size ($\mu$m) | 330.0 | 180.0 | 300.0 | 700.0 | 1220.0 | 3000.0 |
| TS (kg/cm$^2$G) | 216 | 303 | 312 | 344 | 430 | 393 |
| EL (%) | 270 | 370 | 375 | 391 | 402 | 415 |
| B.D.V. (mean; kV) | 1.5 | 2.8 | 3.8 | 5.9 | 5.8 | 6.2 |
| Surface roughness ($\mu$m) | 4.3 | 2.6 | 2.7 | 2.4 | 2.7 | 4.2 |
| Powder prepared by aqueous granulation method | | | | | | |
| Apparent density | 0.78 | 0.83 | 0.78 | 0.75 | 0.68 | 0.88 |
| Flowability (21B method; times) | 8 | 6 | 8 | 8 | 3 | 8 |
| Flowability (23 method; times) | 2 | 0 | 1 | 6 | 2 | 2 |
| Average particle size ($\mu$m) | 330.0 | 410.0 | 390.0 | 380.0 | 300.0 | 350.0 |

TABLE 1-continued

|  | Experimental Example | | | | | |
|---|---|---|---|---|---|---|
|  | 1 | 2 | 3 | 4 | 5 | 6 |
| TS (kg/cm$^2$G) | 217 | 305 | 315 | 345 | 435 | 403 |
| EL (%) | 271 | 365 | 380 | 395 | 405 | 425 |
| B.D.V. (mean; kV) | 1.5 | 3.0 | 4.4 | 6.9 | 7.0 | 12.7 |
| Surface roughness ($\mu$m) | 4.4 | 2.9 | 2.8 | 2.2 | 2.1 | 2.2 |

Experimental Examples 7 to 9

(1) Base Powder

A base powder was prepared in the same preparation steps as in (1) of Experimental Example 2 except that Polyflon M-15 (PTFE homopolymer available from Daikin Industries, Ltd.) was used as a PTFE powder and the number of rotations and screen diameter shown in Table 2 were used. With respect to the obtained base powder, physical properties of the powder and molded article were measured by the mentioned test methods. The results are shown in Table 2.

(2) Hot-water-granulated Powder

A PTFE granular powder was prepared in the same preparation steps as in (2) of Experimental Example 1 except that the base powder obtained in each of Experimental Examples 7 to 9 was used. With respect to the obtained PTFE granular powder, physical properties of the powder and molded article were measured by the mentioned test methods. The results are shown in Table 2.

(3) Powder Prepared by Aqueous Granulation Method

A PTFE granular powder was prepared in the same preparation steps as in (3) of Experimental Example 1 except that the base powder obtained in each of Experimental Examples 7 to 9 was used. With respect to the obtained PTFE granular powder, physical properties of the powder and molded article were measured by the mentioned test methods. The results are shown in Table 2.

Experimental Example 10

(1) Base Powder

A PTFE powder (PTFE homopolymer "Polyflon M-12" available from Daikin Industries, Ltd.) as a reactor powder was used as a base powder, and physical properties of the powder were measured by the mentioned test methods. The results are shown in Table 2.

(2) Hot-water-granulated Powder

A PTFE granular powder was prepared in the same preparation steps as in (2) of Experimental Example 1 except that the base powder obtained in this Experimental Example was used. With respect to the obtained PTFE granular powder, physical properties of the powder and molded article were measured by the mentioned test methods. The results are shown in Table 2.

(3) Powder Prepared by Aqueous Granulation Method

A PTFE granular powder was prepared in the same preparation steps as in (3) of Experimental Example 1 except that the base powder obtained in this Experimental Example was used. With respect to the obtained PTFE granular powder, physical properties of the powder and molded article were measured by the mentioned test methods. The results are shown in Table 2.

Experimental Examples 11 and 12

(1) Base Powder

A base powder was prepared in the same preparation steps as in (1) of Experimental Example 2 except that the mentioned Polyflon M-12 was used as a PTFE powder and the number of rotations and screen diameter shown in Table 2 were used. With respect to the obtained base powder, physical properties of the powder and molded article were measured by the mentioned test methods. The results are shown in Table 2.

(2) Hot-water-granulated Powder

A PTFE granular powder was prepared in the same preparation steps as in (2) of Experimental Example 1 except that the base powder obtained in this Experimental Example was used. With respect to the obtained PTFE granular powder, physical properties of the powder and molded article were measured by the mentioned test methods. The results are shown in Table 2.

(3) Powder Prepared by Aqueous Granulation Method

A PTFE granular powder was prepared in the same preparation steps as in (3) of Experimental Example 1 except that the base powder obtained in each of Experimental Examples 11 and 12 was used. With respect to the obtained PTFE granular powder, physical properties of the powder and molded article were measured by the mentioned test methods. The results are shown in Table 2.

TABLE 2

|  | Experimental Example | | | | | |
|---|---|---|---|---|---|---|
|  | 7 | 8 | 9 | 10 | 11 | 12 |
| Base powder |  |  |  |  |  |  |
| Kind | M-15 | M-15 | M-15 | M-12 | M-12 | M-12 |
| Screen diameter (mm) | 0.7 | 0.4 | — | — | 0.5 | — |
| Number of rotations (rpm) | 5000 | 5000 | 4P | Reactor Powder | 5000 | 4P |
| Apparent density | 0.75 | 0.53 | 0.41 | 0.50 | 0.36 | 0.29 |
| Particle size after coarsely pulverizing ($\mu$m) | 280 | 148 | 41 | 280 | 149 | 40 |
| Dry laser method |  |  |  |  |  |  |
| TS (kg/cm$^2$G) | 170 | 248 | 450 | 320 | 355 | 505 |

TABLE 2-continued

|  | Experimental Example | | | | | |
| --- | --- | --- | --- | --- | --- | --- |
|  | 7 | 8 | 9 | 10 | 11 | 12 |
| EL (%) | 130 | 150 | 380 | 289 | 330 | 410 |
| B.D.V. (mean; kV) | 1.5 | 1.5 | 10.4 | 2.9 | 3.6 | 12.5 |
| Surface roughness ($\mu$m) | 5.4 | 3.8 | 1.7 | 1.6 | 1.7 | 0.8 |
| Powder prepared by hot water granulation method | | | | | | |
| Apparent density | 0.78 | 0.78 | 0.59 | 0.52 | 0.52 | 0.42 |
| Flowability (21B method; times) | 5 | 6 | 0 | 8 | 7 | 0 |
| Flowability (23 method; times) | 0 | 1 | 0 | 2 | 0 | 0 |
| Average particle size ($\mu$m) | 300.0 | 350.0 | 2500.0 | 400.0 | 750.0 | 3500.0 |
| TS (kg/cm$^2$G) | 168 | 200 | 250 | 329 | 356 | 403 |
| EL (%) | 128 | 152 | 180 | 293 | 333 | 380 |
| B.D.V. (mean; kV) | 1.5 | 1.5 | 1.5 | 3.1 | 3.5 | |
| Surface roughness ($\mu$m) | 5.2 | 4.2 | 5.8 | 1.5 | 1.6 | 3.2 |
| Powder prepared by aqueous granulation method | | | | | | |
| Apparent density | 0.78 | 0.82 | 0.85 | 0.52 | 0.59 | 0.83 |
| Flowability (21B method; times) | 5 | 7 | 8 | 8 | 8 | 8 |
| Flowability (23 method; times) | 0 | 2 | 0 | 2 | 0 | 3 |
| Average particle size ($\mu$m) | 300.0 | 360.0 | 380.0 | 400.0 | 390.0 | 330.0 |
| TS (kg/cm$^2$G) | 169 | 205 | 350 | 325 | 354 | 450 |
| EL (%) | 129 | 151 | 380 | 295 | 335 | 350 |
| B.D.V. (mean; kV) | 1.5 | 1.5 | 1.5 | 3.0 | 3.6 | 6.5 |
| Surface roughness ($\mu$m) | 5.1 | 4.1 | 3.3 | 1.5 | 1.6 | 3.3 |

Relation between the physical properties of the granular powders or molded articles obtained in the above Experimental Examples and the particle sizes of primary particles is plotted in FIGS. 1 to 6.

FIG. 1 is a graph for explaining relation between the apparent density and the particle size of primary particles in Experimental Examples 1 to 6. Numeral 1 represents a curve in case of the hot-water-granulated powder, numeral 2 represents a curve in case of the base powder and numeral 3 represents a curve in case of the powder prepared by aqueous granulation method.

As it is clear from FIG. 1, in case of the hot-water-granulated powder, an apparent density equal to that of the powder prepared through conventional aqueous granulation method can be obtained.

Figure 2:
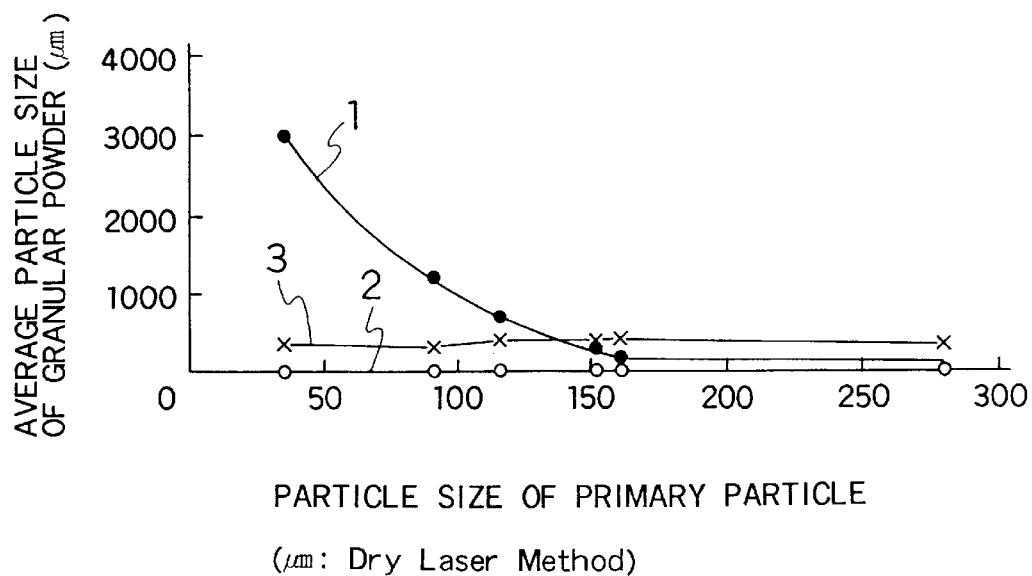
FIG. 2 is a graph for explaining relation of the average particle size of the granular powder and the particle size of primary particles in Experimental Examples 1 to 6.

FIG. 2 is a graph showing relation between the average particle size of the granular powder and the particle size of primary particles in Experimental Examples 1 to 6. Numeral 1 represents a curve in the case of the hot-water-granulated powder, numeral 2 represents a curve in the case of the base powder and numeral 3 represents a curve in the case of the powder prepared by the aqueous granulation method.

As it is clear from FIG. 2, in case where the particle size of the primary particle is not less than 100 $\mu$m, the average particle size of the hot-water-granulated powder which is equal to that in the case of the powder prepared by conventional aqueous granulation method can be obtained.

FIG. 3 is a graph showing relation between the flowability and the particle size of primary particles in Experimental Examples 1 to 6. Numeral 1 represents a curve in the case of the hot-water-granulated powder, numeral 2 represents a curve in the case of the base powder and numeral 3 represents a curve in the case of the powder prepared by the aqueous granulation method.

As it is clear from FIG. 3, in case where the particle size of the primary particle is not less than 100 $\mu$m, the flowability of the hot-water-granulated powder which is equal to that in the case of the powder prepared by conventional aqueous granulation method can be obtained.

Figure 4:
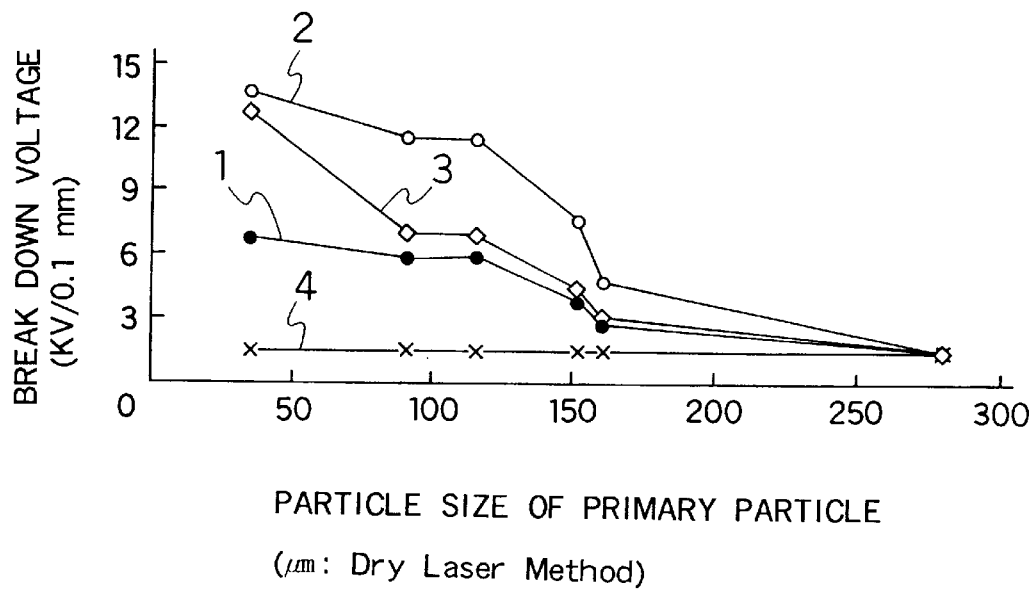
FIG. 4 is a graph for explaining relation of the break down voltage and the particle size of primary particles in Experimental Examples 1 to 12.

FIG. 4 is a graph showing relation between the break down voltage and the particle size of primary particles in Experimental Examples 1 to 12. Numeral 1 represents a curve in the case of the hot-water-granulated powder, numeral 2 represents a curve in the case of the base powder and numeral 3 represents a curve in the case of the powder prepared by the aqueous granulation method. Any of the powders are those obtained in Experimental Examples 1 to 6. Numeral 4 represents a curve in the case of the hot-water-granulated powder of unmodified PTFE which was obtained in Experimental Examples 7 to 12.

As it is clear from FIG. 4, in case where the particle size of the primary particle is not less than 100 82 m, the break down voltage of the hot-water-granulated powder which is equal to that in the case of the powder prepared by conventional aqueous granulation method can be obtained.

Figure 5:
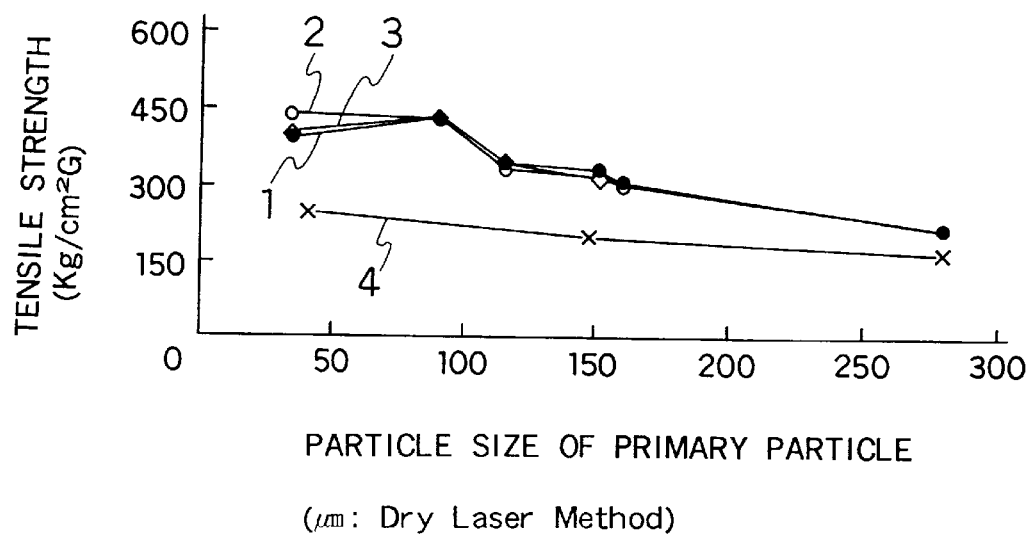
FIG. 5 is a graph for explaining relation of the tensile strength and the particle size of primary particles in Experimental Examples 1 to 12.

FIG. 5 is a graph showing relation between the tensile strength and the particle size of primary particles in Experimental Examples 1 to 12. Numeral 1 represents a curve in the case of the hot-water-granulated powder, numeral 2 represents a curve in the case of the base powder and numeral 3 represents a curve in the case of the powder prepared by the aqueous granulation method. Any of the powders are those obtained in Experimental Examples 1 to 6. Numeral 4 represents a curve in the case of the hot-water-granulated powder of unmodified PTFE which was obtained in Experimental Examples 7 to 9.

As it is clear from FIG. 5, the tensile strength of the hot-water-granulated powder which is equal to that in the case of the powder prepared by conventional aqueous granulation method can be obtained.

Figure 6:
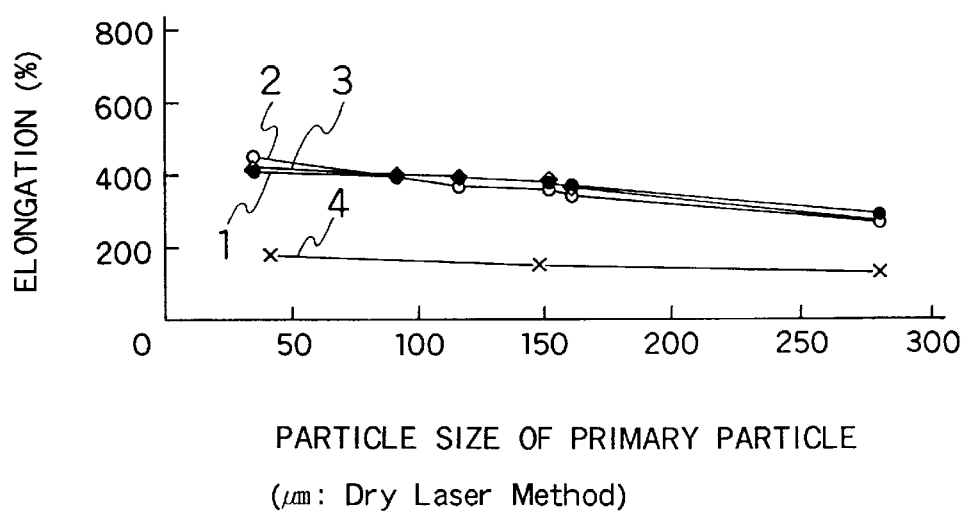
FIG. 6 is a graph for explaining relation of the elongation and the particle size of primary particles in Experimental Examples 1 to 12.

FIG. 6 is a graph showing relation between the elongation and the particle size of primary particles in Experimental Examples 1 to 12. Numeral 1 represents a curve in the case of the hot-water-granulated powder, numeral 2 represents a curve in the case of the base powder and numeral 3 represents a curve in the case of the powder prepared by the aqueous granulation method. Any of the powders are those obtained in Experimental Examples 1 to 6. Numeral 4 represents a curve in the case of the hot-water-granulated powder of unmodified PTFE which was obtained in Experimental Examples 7 to 9.

As it is clear from FIG. 6, the tensile strength of the hot-water-granulated powder which is equal to that in the case of the powder prepared by conventional aqueous granulation method can be obtained.

INDUSTRIAL APPLICABILITY

As is clear from the above-mentioned results, in each of the processes of the present invention, the following effects can be obtained.

In the process for granulating with stirring, in an aqueous medium, a powder of perfluoro(vinyl ether)-modified PTFE prepared by suspension polymerization and having an average particle size of 100 to 300 μm, there can be obtained a modified PTFE granular powder which has excellent handling property, i.e. flowability and apparent density of the powder and gives a molded article having excellent physical properties.

Also when the granulation is carried out with stirring in an aqueous medium of 50° to 160° C. under a pressure of 0 to 5 kg/cm²G in the absence of an organic liquid, the same modified PTFE granular powder as above can be obtained without using an expensive organic liquid.

Also when the granulation is carried out with stirring in an aqueous medium of 10° to 120° C. under a pressure of 0 to 5 kg/cm²G in the presence of an organic liquid, the same modified PTFE granular powder as above can be obtained.

Also when the powder of perfluoro(vinyl ether)-modified PTFE powder prepared by suspension polymerization and having an average particle size of 100 to 150 μm is used, the break down voltage of the molded article obtained by molding the granular powder becomes not less than 3.5 kV.

We claim:

1. A process for preparing a granular powder of modified polytetrafluoroethylene by granulating with stirring a powder of perfluoro(vinyl ether)-modified polytetrafluoroethylene obtained by suspension polymerization and having an average particle size of 100 to 300 μm, in an aqueous medium of 50° to 160° C. under a pressure of 0 to 5 kg/cm²G in the absence of an organic liquid, to obtain a granular powder having an apparent density of from 0.6 to 0.9 and which when molded results in a molded article having a break down voltage of not less than 3.5 kV.

2. The process for preparing a granular powder of modified polytetrafluoroethylene of claim 1, wherein the average particle size of the powder of perfluoro(vinyl ether)-modified polytetrafluoroethylene obtained by suspension polymerization is from 100 to 152 μm.

3. The process for preparing a granular powder of modified polytetrafluoroethylene of claim 1, wherein the modified polytetrafluoroethylene is a copolymer obtained by copolymerizing 99.0 to 99.999% by mole of tetrafluoroethylene with 1.0 to 0.001% by mole of perfluoro(vinyl ether) represented by the formula (I):

(I)

wherein $R_f$ is a perfluoroalkyl group having 1 to 10 carbon atoms, a perfluoro(alkoxyalkyl) group having 4 to 9 carbon atoms, an organic residue represented by the formula (II):

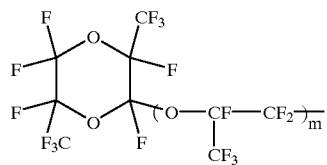
(II)

wherein m is 0 or an integer of 1 to 4, or an organic residue represented by the formula (III):

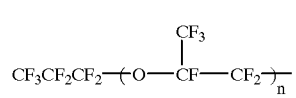
(III)

wherein n is an integer of 1 to 4.

4. The process for preparing a granular powder of modified polytetrafluoroethylene of claim 1, wherein the granulation is carried out in the presence of 0.1 to 10% by weight of an aqueous dispersion of polytetrafluoroethylene prepared by emulsion polymerization, on the basis of the perfluoro(vinyl ether)-modified polytetrafluoroethylene powder.

5. The process for preparing a granular powder of modified polytetrafluoroethylene of claim 4, wherein the polytetrafluoroethylene in the aqueous dispersion of polytetrafluoroethylene is tetrafluoroethylene homopolymer or a modified polytetrafluoroethylene obtained by copolymerizing 98.0 to 99.999% by weight of tetrafluoroethylene with 2.0 to 0.001% by weight of other fluorine-containing monomer.

6. The process for preparing a granular powder of modified polytetrafluoroethylene of claim 2, wherein the modified polytetrafluoroethylene is a copolymer obtained by copolymerizing 99.0 to 99.999% by mole of tetrafluoroethylene with 1.0 to 0.001% by mole of perfluoro(vinyl ether) represented by the formula (I):

(I)

wherein $R_f$ is a perfluoroalkyl group having 1 to 10 carbon atoms, a perfluoro(alkoxyalkyl) group having 4 to 9 carbon atoms, an organic residue represented by the formula (II):

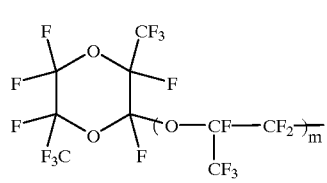
(II)

wherein m is 0 or an integer of 1 to 4, or an organic residue represented by the formula (III):

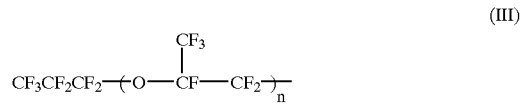
(III)

wherein n is an integer of 1 to 4.

7. The process for preparing a granular powder of modified polytetrafluoroethylene of claim 6, wherein the granulation is carried out in the presence of 0.1 to 10% by weight of an aqueous dispersion of polytetrafluoroethylene prepared by emulsion polymerization, on the basis of the perfluoro(vinyl ether)-modified polytetrafluoroethylene powder.

8. The process for preparing a granular powder of modified polytetrafluoroethylene of claim 7, wherein the polytetrafluoroethylene in the aqueous dispersion of polytetrafluoroethylene is tetrafluoroethylene homopolymer or a modified polytetrafluoroethylene obtained by copolymerizing 98.0 to 99.999% by weight of tetrafluoroethylene with 2.0 to 0.001% by weight of other fluorine-containing polymer.

* * * * *